United States Patent
Cleary et al.

(10) Patent No.: US 8,762,511 B2
(45) Date of Patent: Jun. 24, 2014

(54) MANAGING NETWORK ELEMENTS

(75) Inventors: David Cleary, Athlone (IE); Liam Fallon, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 62 days.

(21) Appl. No.: 13/254,669

(22) PCT Filed: Mar. 6, 2009

(86) PCT No.: PCT/EP2009/052690
§ 371 (c)(1),
(2), (4) Date: Nov. 12, 2011

(87) PCT Pub. No.: WO2010/099832
PCT Pub. Date: Sep. 10, 2010

(65) Prior Publication Data
US 2012/0059923 A1    Mar. 8, 2012

(51) Int. Cl.
*G06F 15/173*    (2006.01)
*H04L 12/24*    (2006.01)
*H04W 24/00*    (2009.01)

(52) U.S. Cl.
CPC ........... *H04L 41/0233* (2013.01); *H04W 24/00* (2013.01); *H04L 41/022* (2013.01)
USPC ...................................................... 709/223

(58) Field of Classification Search
CPC ............................... H04W 4/003; H04W 4/006
USPC ...................................................... 709/223
See application file for complete search history.

(56) References Cited

U.S. PATENT DOCUMENTS

| | | | |
|---|---|---|---|
| 7,346,685 B2 * | 3/2008 | Kitamura et al. | 709/225 |
| 7,385,503 B1 * | 6/2008 | Wells et al. | 340/539.26 |
| 7,886,033 B2 * | 2/2011 | Hopmann et al. | 709/223 |
| 7,953,835 B2 * | 5/2011 | Yoshikawa et al. | 709/223 |
| 7,961,650 B2 * | 6/2011 | Davies | 370/255 |
| 7,996,506 B2 * | 8/2011 | Tagawa | 709/223 |
| 8,145,698 B1 * | 3/2012 | Kaufman et al. | 709/201 |
| 8,559,447 B2 * | 10/2013 | Jetcheva et al. | 370/401 |
| 2012/0009972 A1 * | 1/2012 | Viering et al. | 455/525 |

FOREIGN PATENT DOCUMENTS

| | | |
|---|---|---|
| WO | 2008/051458 A2 | 5/2008 |
| WO | 2009/021981 A2 | 2/2009 |

OTHER PUBLICATIONS

PCT International Search Report, mailed Jun. 12, 2009, in connection with International Application No. PCT/EP2009/052690.

(Continued)

*Primary Examiner* — Kristie Shingles
(74) *Attorney, Agent, or Firm* — Leffler Intellectual Property Law, PLLC (57) ABSTRACT

A method for use in management of network elements in a communications network performed by a network element of said network. The method comprises receiving by an agent operating in said network element a request to execute a first function, wherein said first function relates to management of at least one network element; sending to said first function a message corresponding to said request and executing said first function. Said request being from a predefined set of requests and said first function being from a predefined set of functions. Said first function is implemented in a network element where it is to be executed.

17 Claims, 4 Drawing Sheets

(56) References Cited

OTHER PUBLICATIONS

Harrington Cabletron Systems D et al: "An Architecture for Describing SNMP Management Frameworks; rfc2571.txt" IETF Standard, Internet Engineering Task Force, IEFT, CH, Apr. 1, 1999, XP015008354 ISSN: 0000-0003.

3GPP Technical Specification 32.500, V8.0.0 Telecommunication Management Self-Organizing Networks (SON) Concepts and Requirement (Release 8), 3GPP Technical Specification Group Services and System Aspects, Dec. 2008, XP002530000, Sophia Antipolis, France.

Lehser, F. et al. "Next Generation Mobile Networks Use Cases related to Self Organising Network, Overall Description" NGMN Alliance, [Online] No. V2.02, Dec. 5, 2008, XP002530001. Retrieved from the Internet: URL: http://www.ngmn.org/uploads/media/NGMN_Use_Cases_related_to_Self_Organising_Network_Overall_Description.pdf>.

3GPP Technical Specification 32.302, V7.0.0 Technical Specification Group Services and System Aspects; Telecommunication management; Configuration Management (CM); Notification Integration Reference Point (IRP): Information Service (IS), Release 7, Jun. 2007.

W3C Working Group Note, Feb. 11, 2004, Web Services Architecture, W3C, 2004.

3GPP TS 32.101, V 8.3.0 "Principles and high level requirements" (Release 8), Sep. 2008, all pages.

3GPP TS 32.150, V 8.2.0 "Integration Reference Point (IRP) concept and definitions." (Release 8), Jun. 2008, all pages.

"A Requirement Specification by the NGMN Alliance—NGMN Recommendation on SON and O&M Requirements." Next Generation Mobile Networks, Release Date Dec. 5, 2008, all pages.

Lehser, Frank "Self Organising LTE/SAE Network—Operator Requirements and Examples" T-Mobile, Sep. 25, 2006, all pages.

Christensen, Erik et al. "Web Services Description Language (WSDL) 1.1" W3C Note, Mar. 15, 2001. http://www.w3.org/TR/2001/NOTE-wsdl-20010315, all pages.

* cited by examiner

MANAGING NETWORK ELEMENTS

TECHNICAL FIELD

The present invention relates to telecommunications network in general, and in particular, to implementing functions required for managing network elements operating in said network.

BACKGROUND

The concept of Self Organising Networks (SON) is driven in the telecommunications industry by network operators as a way of reducing cost of operating the networks. This will be especially important with the introduction of home base stations also known as home eNodeBs, which will be part of the telecommunications network run by the network operator, but installed at homes of the end users. This makes the task of managing the network a big challenge due to the number of the home base stations and the fact that they will be supplied by different vendors. A self organising network may provide mechanisms for self-configuration and self-discovery that enable network devices (managed elements) of the SON to be transparent to ordinary users (e.g. the home eNodeB installed in the home of an individual user). SON networks also ensure robustness of the network during dynamic changes of network topology and link breakages. Operational and maintenance (OAM) architecture of a self organising network includes a domain manager (DM) and its managed elements (ME), an enterprise management system (EMS) and other elements of the network.

The present solutions defined in 3GPP standards require heavy involvement of the Network Management System (NMS) that needs very detailed knowledge of static Network Resource Models (NRM), interactions and semantics of the internal and external relationships between these models. This known approach is difficult to scale, or at least scaling it up by adding potentially millions of home eNodeBs will make the management layer thicker and more distributed. All that will additionally cause substantial increase of OAM traffic going up and down the hierarchy of the network.

SUMMARY

According to a first aspect of the present invention there is provided a method for use in management of network elements in a communications network performed by a network element of said network. The method comprises receiving by an agent operating in said network element a request to execute a first function, wherein said first function relates to management of at least one network element; sending to said first function a message corresponding to said request and executing said first function. Said request being from a predefined set of requests and said first function being from a predefined set of functions. Said first function is implemented in a network element where it is to be executed.

According to a second aspect of the present invention there is provided a network element for use in a communications network comprising an agent servicing an interface for communicating with other network elements and a first function related to management of at least one network element, wherein said first function being from a predefined set of functions. Said agent is adapted to receive a request to execute said first function. Said request is from a predefined set of requests. Said agent is further adapted to send to said first function a message corresponding to said request, wherein said message triggers execution of said first function in said network element.

According to a third aspect of the present invention there is provided a communications network comprising a plurality of network elements. At least one of said network elements comprises an agent servicing an interface for communicating with other network elements and a first function related to management of at least one network element. Said first function is from a predefined set of functions. Said agent is adapted to receive a request to execute said first function. Said request is from a predefined set of requests. Said agent is further adapted to send to said first function a message corresponding to said request, wherein said message triggers execution of said first function in said network element Further features of the present invention are as claimed in the dependent claims.

In the present invention SON functions are implemented at the appropriate level of abstraction in the network and the network management layer need not have a very fine-grained knowledge of the NRM models, their interactions and semantics. An additional advantage is that the solution according to the present invention scales well when it is implemented in the communications network. Because the implementation of SON functions can be deployed close to, or even on, the managed element affected by the function, bandwidth use for exchange OAM traffic is significantly reduced. It is also important that by distributing the implementations of the SON functions close to the network elements that are affected by these functions, processing and storage is distributed and not located in one NMS system. Because it is also possible to have peer-to-peer co-operation between Domain Managers and even between managed elements in the implementation of the SON function the design choices for the implementers are improved.

The present invention is well aligned with the concept where networks are autonomously managed without the need for detailed interference by a NMS.

BRIEF DESCRIPTION OF THE DRAWINGS

The present invention will be understood and appreciated more fully from the following detailed description taken in conjunction with the drawings in which.

DETAILED DESCRIPTION

The term network element used herein refers to an entity that is part of a communications network and from the perspective of OAM architecture includes for example: domain manager (DM), managed element, Network Management System.

Figure 1:
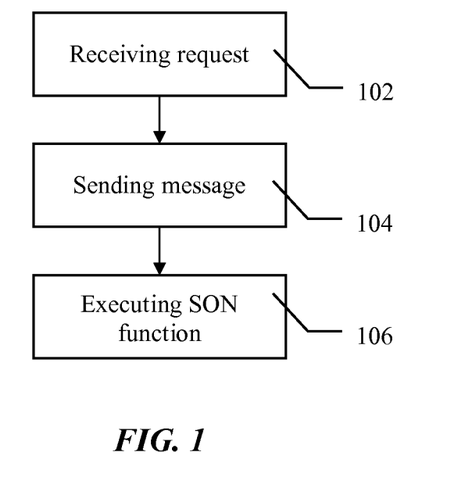
FIG. 1 is a diagram illustrating a method for use in management of network elements in a communications network in one embodiment of the present invention.
Figure 7:
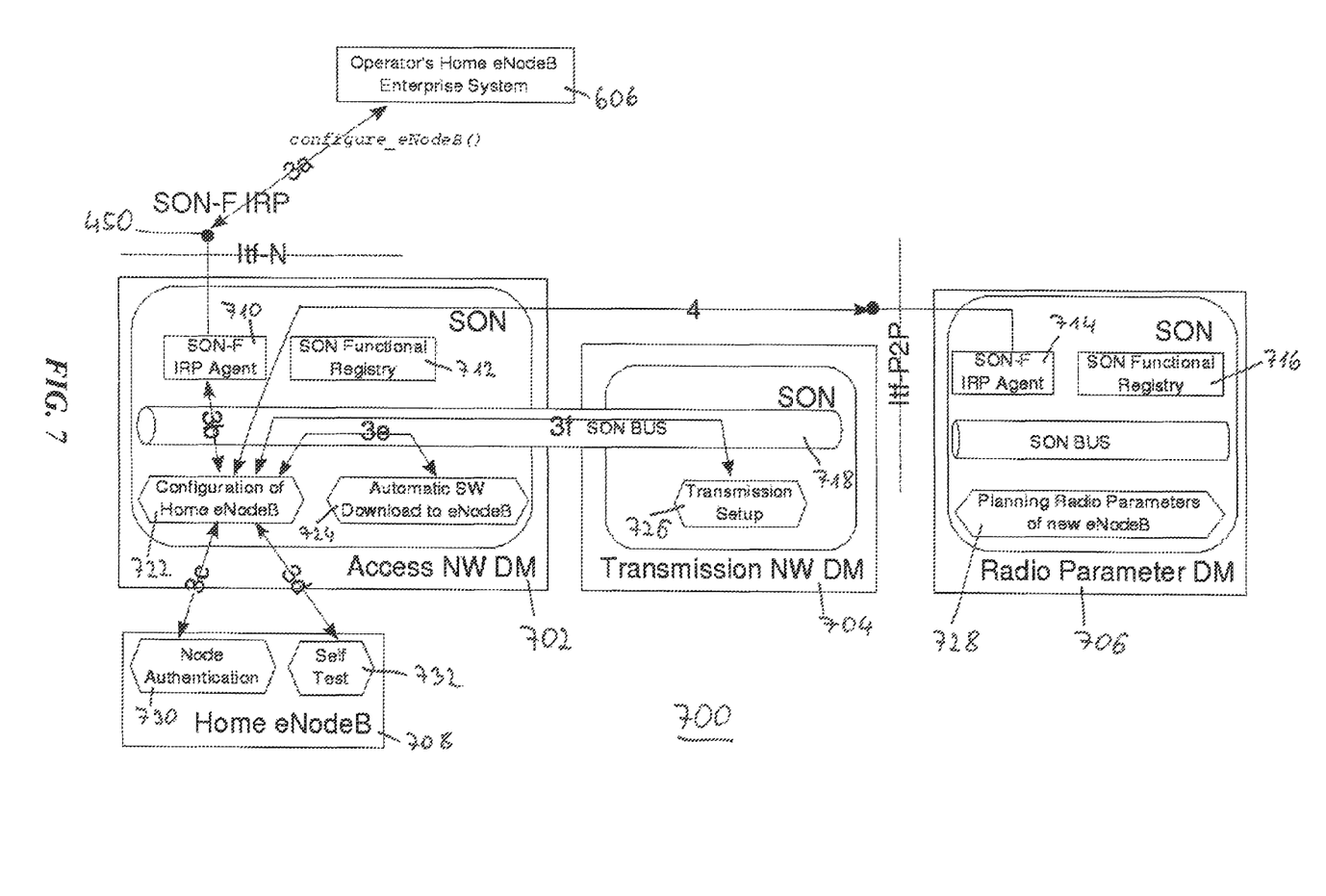
FIG. 7 is a diagram illustrating a process of configuration of home eNodeB in a communications network in one embodiment of the present invention.

With reference to FIG. 1 and FIG. 7 one embodiment of a method used in management of network elements in a communications network 700 is presented. The steps of the method in a simplest embodiment are performed by a domain manager 702 operating in the communications network 700. In alternative embodiments the steps can also be carried out by other types of network elements.

The first step of the method comprises receiving 102 by an agent 710 operating in said domain manager 702 a request to execute a first function 722 implemented in this domain manager 702. The agent 710 is servicing an interface 450 and via said interface the requests are received. The first function 722 relates to management of at least one network element. The request received by the domain manager is one from a predefined set of requests. By using a predefined set of requests it is possible to implement the method in a network with equipment supplied by different vendors. For the same reason said first function 722 is also one of functions from a predefined set of functions related to management of network elements, also referred to as a SON function. The first function 722 is implemented in the domain manager 702 and if invoked it is to be executed in said domain manager 702. The implementation of the SON function or functions in the element where the function is to be executed simplifies the process of managing this element of the network because all the information necessary for executing this function is readily available and does not have to be transmitted from the network element to other parts of the network. Once the request is received by the agent 710 in the next step the agent sends 104 a message that corresponds to the received request to said first function 722 and upon reception of the message said first function is executed 106.

Figure 4:
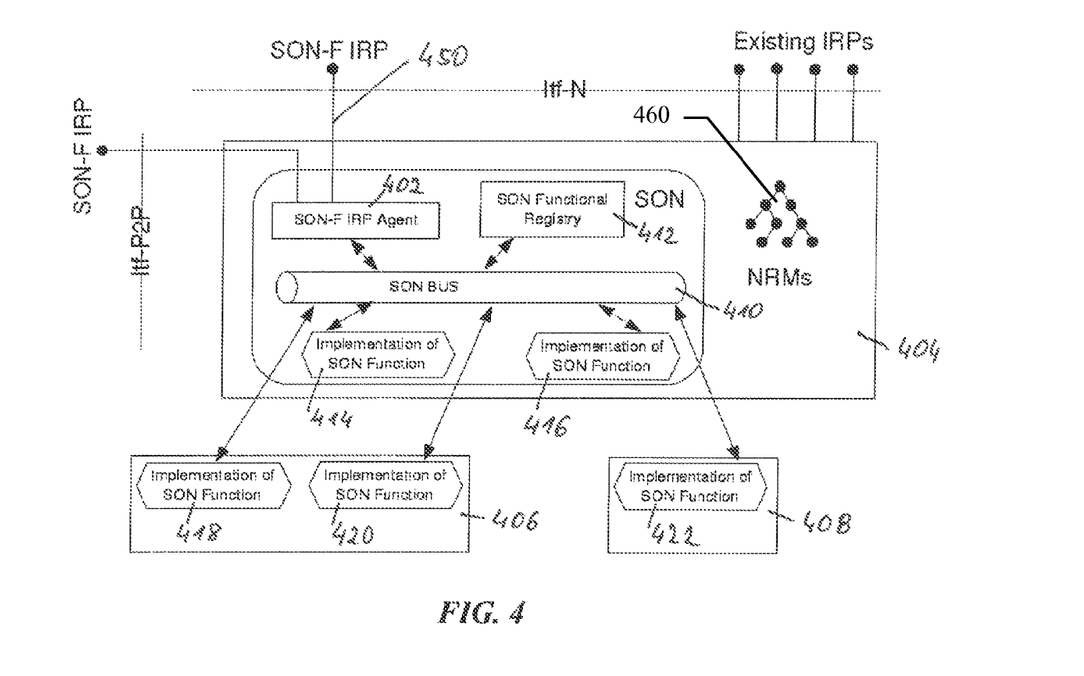
FIG. 4 is a diagram illustrating a communications network in one embodiment of the present invention.

In one embodiment the agent 710 and the SON function 722 invoked by said agent are implemented in the same network element—e.g. domain manager 702 as illustrated in FIG. 7 or agent 402 and SON function 414 shown in FIG. 4. In other embodiment is also possible that the SON function and the agent invoking it are implemented in two different devices. This embodiment is shown in FIG. 4, where the agent 402 implemented in domain manager 404 can invoke a SON function 418 or 420 implemented in a separate managed element 406.

The inventors introduced a new Interface IRP (Integration Reference Point), called SON Functional IRP (SON-F IRP), into the 3GPP Integration Reference Point framework so that EMS and other users can call the SON functions in the managed network. The embodiments introduce references into 3GPP NRM models that allow managed objects to reference the SON functions that affect them.

Figure 3:
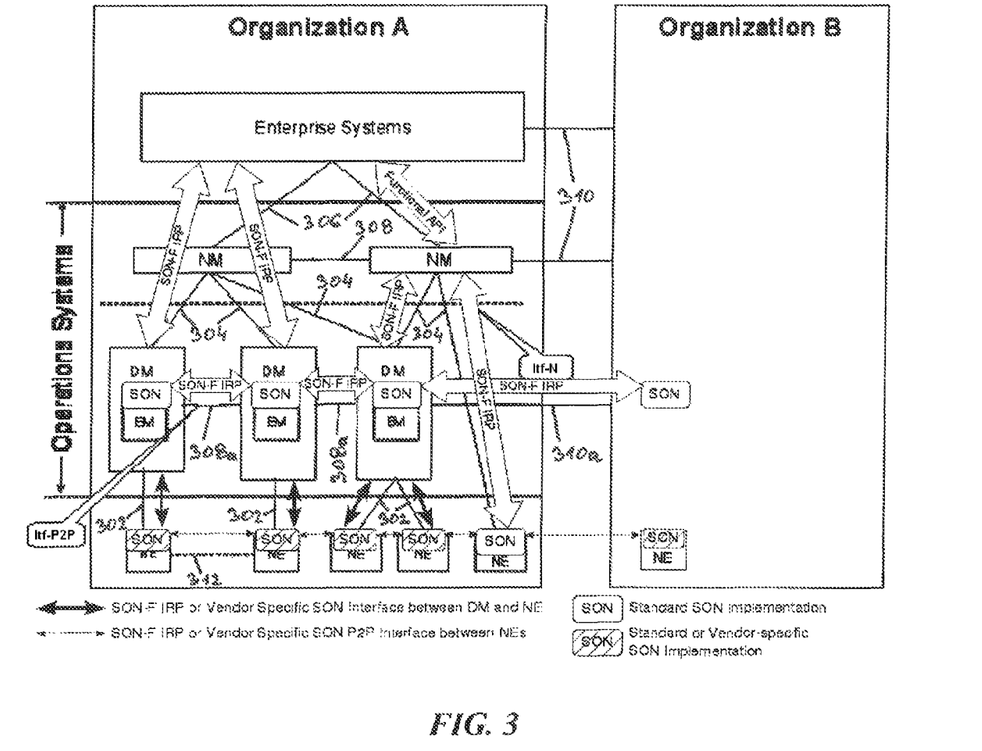
FIG. 3 is a diagram illustrating a communications network in one embodiment of the present invention.

The embodiments of the method disclosed allow for implementation of SON functions at the level appropriate for these functions in the self organising network. This method extends the 3GPP approach to management in a backwardly compatible manner and FIG. 3 shows how the method relates to the 3GPP Management Reference Model.

The SON-F IRP is a functional API (Application Programming Interface) that allows a client to invoke a subset of the SON functions listed in Table 1 below. The list presented in Table 1 is not exhaustive and other SON functions could be specified as standard or as vendor-specific extensions.

TABLE 1

| | Self-Configuration Use Cases |
|---|---|
| 1 | Planning of eNB location, capacity and coverage |
| 2 | Planning radio parameters of a new eNB |
| 3 | Planning transport parameters of a new eNB |
| 4 | Planning data alignment for all neighbour nodes |
| 5 | HW installation of eNB |
| 6 | Transmission setup |
| 7 | Node authentication |
| 8 | Setup of secure tunnel to O&M and access gateways |
| 9 | Automatic Inventory |
| 10 | Automatic SW Download to eNB |
| 11 | Self test |
| 12 | Configuration of Home eNB |
| | Self-Optimisation Use Cases |
| 1 | Overall optimisation requirements: Support of centralized optimisation entity |
| 2 | Neighbour Cell List Optimisation |
| 3 | Interference Control |
| 4 | Handover Parameter Optimisation |
| 5 | QoS related parameter Optimisation |
| 6 | Load Balancing |
| 7 | Optimisation of Home eNB |
| 8 | RACH Load Optimisation |
| | Fault Management and Fault Correction Use Cases |
| 1 | Information Correlation |
| 2 | Cell/service outage detection & compensation |
| 3 | Mitigation of unit outage |
| | OAM related SON Use Cases |
| 1 | Hardware/Capacity extensions |
| 2 | Automated NEM upgrade |
| 3 | Compensation for Outage of higher level network elements |
| 4 | Fast recovery of unstable NEM system |
| | SON Enabling Use Cases |
| 1 | Performance Management in real time |
| 2 | Direct KPI reporting in real time |
| 3 | Subscriber and equipment trace |

Returning to FIG. 3, the IRP may be used on the northbound interface (Itf-N) 304 in a north-south manner by an EMS or by an NMS towards a domain manager, DM or a managed element. It may also be used in an east-west manner on the Itf-P2P 308a and 310a so that domain managers can access SON functions in other domain managers. The SON-F IRP or vendor-specific subsets of it may be used between domain managers and managed elements, interface 302, and even between managed elements, interface 312.

As illustrated in FIG. 4 SON functions 414-422 are implemented in domain managers 404 and managed elements 406, 408. In the case where a domain manager or a managed element supports the SON-F IRP, the SON implementation in that domain manager or managed element is a full implementation of a subset of the SON functions implemented in the network. The element 404 in FIG. 4 in most situations in this description is referred to as a domain manager, but it is important to note that the full implementation of a subset of the SON functions (i.e. with SON-F IRP agent and register) is also possible in a managed element. In the case of a managed element, that supports SON functions via a domain manager, it may support a vendor-specific implementation of the SON functions with its domain manager providing the complete implementation of the IRP.

SON-F IRP

In order to implement the SON-F IRP 450 as a functional API (Application Programming Interface) an agent 402 handling the traffic on the SON-F IRP 450 interface is installed in a domain manager 404 as illustrated in FIG. 4. As discussed earlier, in an alternative embodiment, the element 404 in FIG.

4 can be a managed element with a full implementation of a subset of SON functions. The SON-F IRP supports a number of method calls. In one embodiment the method calls include, although this is not an exhaustive list:

getSupportedSONFunctions( ): This method returns a list of the SON functions supported by this agent. The list will be a subset of the functions listed in Table 1.

<invokeSONFunction>(arg . . . ): A method used to call a particular SON function. There will be a method for each member of the list returned in the getSupportedSONFunctions ( ) method.

setExternalRegistry (registry): The SON-F IRP supports use of an external registry, such as a UDDI (Universal Description Discovery and Integration) registry. A user calls this method once to set the address of the external registry. From then on, the SON-F agent notifies the specified external registry of all changes to the supported SON functions.

In one embodiment the SON-F IRP 450 uses the notification IRP as defined in 3GPP TS 32.302 V7.0.0 to inform users of changes to its list of supported SON functions. In one embodiment the users can register for the SupportedSONFunctionsModified notification on the Notification IRP towards the domain manager in question. When the list of supported SON functions changes, the notification is sent to all registered users.

In accordance with 3GPP management practice for IRPs, the SON-F IRP may be implemented using any technology. In one embodiment of the present invention a Web Services interface (as specified in Web Services Architecture, W3C Working Group Note 11 Feb. 2004) can be used with the SON-F IRP specified in Web Services Description Language.

Additions to NRM IRPs

Figure 2:
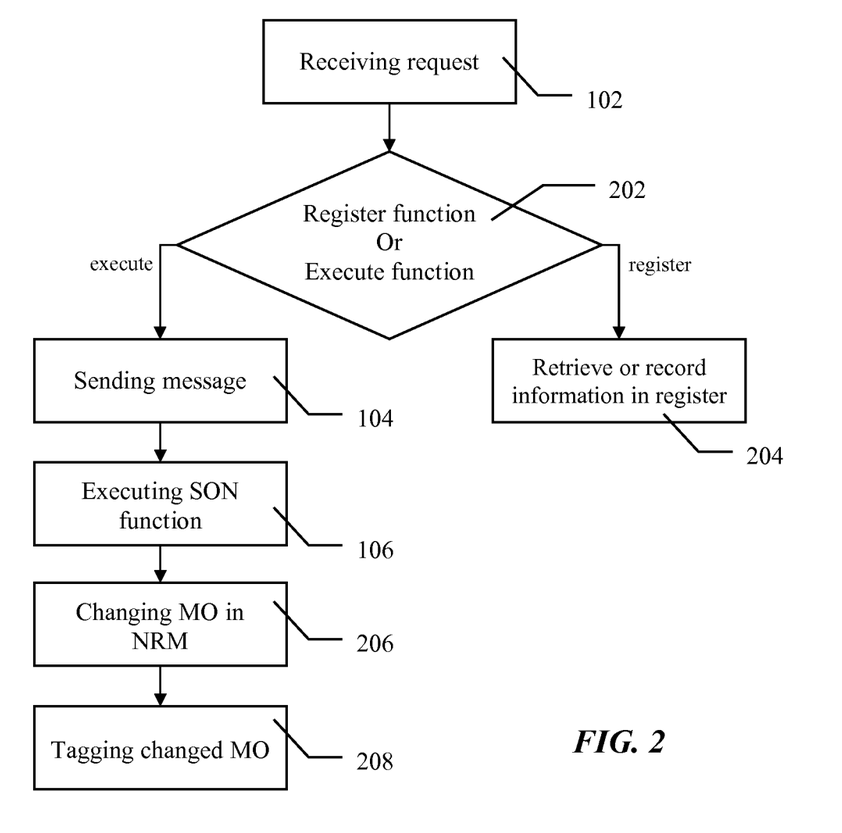
FIG. 2 is a diagram illustrating a method for use in management of network elements in a communications network in an alternative embodiment of the present invention.

The SON functions affect Managed Objects (MO) in a NRM (Network Resource Model) 460. An optional attribute is introduced in Managed Objects and this attribute lists the SON functions that affect that particular MO. A Managed Object is a representation of an entity that is managed in the network. This entity could be an entire network, a network element, a cell, a link, a board, or even a single parameter like the speed of a connection. A Managed Element is a physical device that has a management interface. An example of a Managed Element is a router, switch, base station etc. In fact, a Managed Element appears as a Managed Object called "ManagedElement" in a NRM 460. All the information that is being managed is modelled as a Network Resource Model 460. The NRM 460 is an object oriented hierarchy made up of Managed Objects. When a SON function is executed, it will affect the NRM in some way: MOs may be added or deleted, and attributes in MOs may change 206. In a preferred embodiment of the present invention, in the case of changes to the NRM 460, all MOs in the NRM 460 that are changed 206 by the SON function are tagged 208 with the SON function and transaction ID that changed them.

SON Functional Reference Implementation

FIG. 4 depicts a reference implementation of SON functions in a domain manager 404 and the managed elements 406 and 408 it manages. The embodiment implements a SON bus 410, which is a software bus used for communication between the various components that implement the SON functions, e.g. between the implemented SON functions and between the agent and the implemented SON functions. The SON-F IRP agent 402 handles the messaging over the SON-F IRP 450 to the user of the IRP (i.e. to and from EMS, NMS or domain manager). The SON functional registry 412 keeps track of the SON functions 414-422 implemented in the DM 404 or NE 406, 408. Each SON function has a separate implementation on the DM 404 or on the NE 406, 408 it manages.

The domain manager 702, and in alternative embodiments also other network elements, comprise a register 712 used for recording information about the SON functions 722, 724 implemented in said domain manager 702. In a preferred embodiment the register also is used for storing information on SON functions 730, 732 implemented in managed elements (e.g. home eNodeB 708) controlled by the domain manager 702 and/or about SON functions 726 implemented in a peer domain manager 704. In said register 712 SON functions and changes of the SON functions implemented in said network elements 702, 704, 708 are recorded.

FIG. 2 illustrates a preferred embodiment of the present invention when the requests received by the agent 710 or 402 over the SON-F IRP 450 can relate to execution of a SON function or an operation on the register 712 or 412. When a request is received 102 it is checked 202 which of the two operations it relates to. When SON function implementation starts, it registers itself with the SON functional registry 412. When a getSupportedSONFunctions( ) call is received on the SON-F IRP 450, it is passed to the SON functional registry 412, which returns 204 a list of supported SON functions. When an <invokeSONFunction>(arg . . . ) call is received, it is passed 104 by the SON-F IRP agent 402 to the appropriate SON function implementation, e.g. 414, for processing 106. If a setExternalRegistry(registry) call is received, it is passed to the SON functional registry 412. The SON functional registry 412 updates the external registry each time its list of SON functions is modified. The SON functional registry 412 also handles 204 Notification IRP registrations for SupportedSONFunctionsModified notifications and sends a SupportedSONFunctionsModified notification to each subscriber when the list of SON functions is updated.

Figure 5:
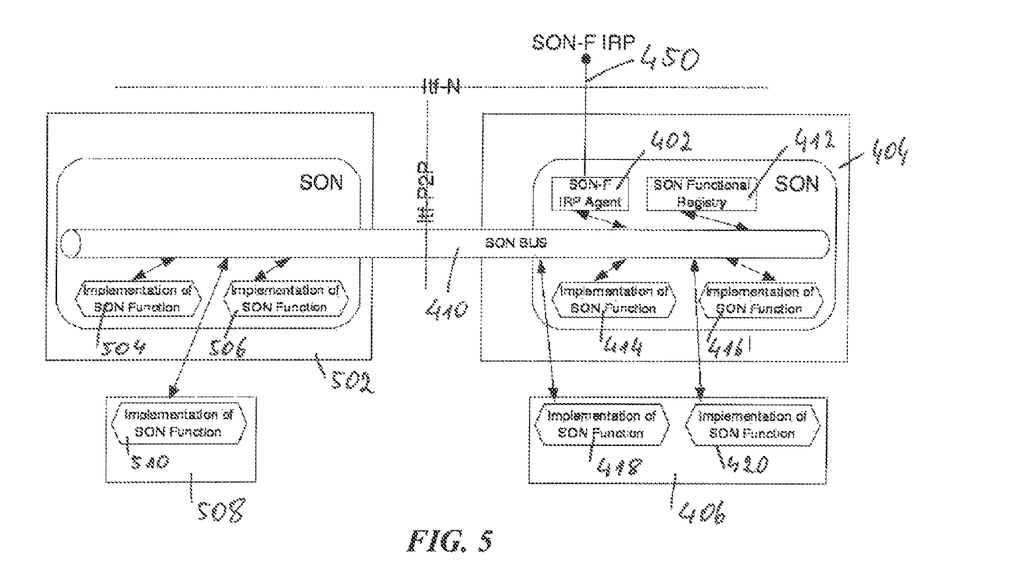
FIG. 5 is a diagram illustrating a communications network in one embodiment of the present invention.

A multi-DM implementation of SON functions is also envisaged as illustrated in FIG. 5. In such an implementation, the SON bus 410 handles SON function implementations 414-420, 504, 506, and 510, registrations and delegations between co-operating domain managers 404, 502 over the Itf-P2P interface.

One practical realization of the reference implementation is to describe each SON functional implementation in WSDL, with each implementation published as a web service. The SON bus 410 is in a preferred embodiment realized as an ESB (Enterprise Service Bus).

Example Use Case

Configuration of Home eNodeB

Figure 6:
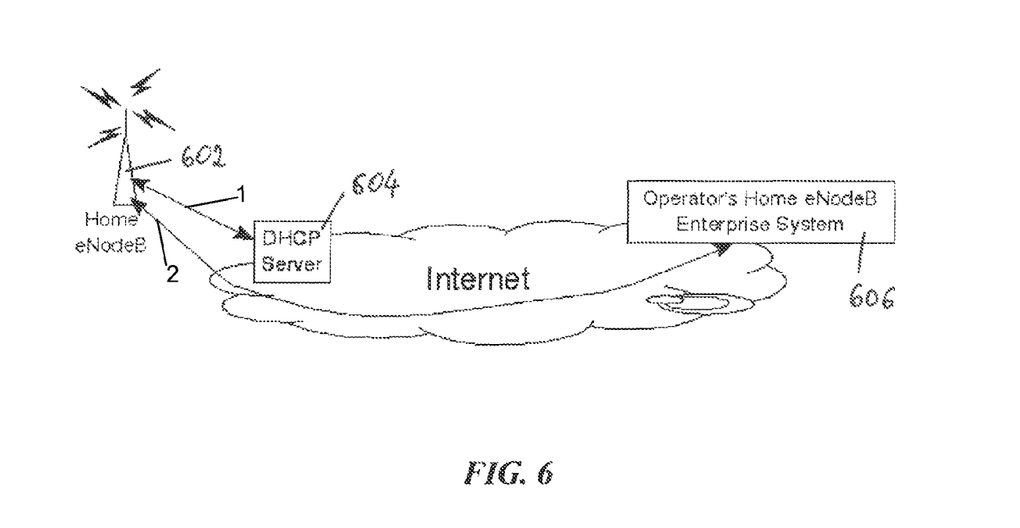
FIG. 6 is a diagram illustrating a process of configuration of home eNodeB in a communications network in one embodiment of the present invention.

With reference to FIG. 6 and FIG. 7 and the following description it is explained how a home eNodeB is configured using embodiment of the present invention.

There are four steps in the Configuration of Home eNodeB use case as specified in NGMN Recommendation on SON & OAM (A Requirement Specification by Next Generation Mobile Networks Alliance). They are:

1. Auto-configuration as a part of home network to obtain its IP address, relevant DHCP options and establish the connection to IP broadband network.
2. Configuration of a secure connection to mobile core network via an available backhaul and mutual authentication between the home eNodeB and the mobile network via secure VPN.
3. Download of the relevant information and software/firmware updates from the mobile core network.
4. Initial radio parameters configuration.

In step 1, as illustrated in FIG. 6, after switching on, the home eNodeB 602 connects to a DHCP sever 604 and obtains its IP address, relevant DHCP options and establishes connection to IP broadband network. In an embodiment alternative to using DHCP the home eNodeB could also be statically configured with it's network information or the user could enter the information on a local craft terminal. In step 2 of the process the home eNodeB 602 informs its operator's enterprise system 606 that said eNodeB exists and has been switched on. Once the EMS 606 knows the home eNodeB 602 exists, the home eNodeB 602 can be configured, steps 3 and 4 in the process above, and brought into service.

One example of implementation of steps 3 and 4 in the process above using embodiment of the present invention is illustrated in FIG. 7:

- 3a: The operators EMS 606 uses the SON-F IRP 450 towards the Access Network Domain Manager 702 to configure the newly discovered home eNodeB 708 by calling the configure_eNodeB( ) SON function 722 implemented in the domain manager 702. The SON-F IRP agent 710 receives the request.
- 3b: The SON-F IRP agent 710 passes the request to the "Configuration of Home eNodeB" SON function 722 in the access network domain manager 702. When said function 722 accepts the request, it becomes the coordinating entity in the configuration process. As it will be described in this embodiment the SON function 722 can trigger execution of other functions 724, 730, 732 implemented in the domain manager 702 where the agent 710 and the SON function 722 are implemented or in a second network element 708 (home eNodeB), wherein said home eNodeB 708 is controlled by the domain manager 702.
- 3c: The Configuration of Home eNodeB function 722 authenticates the home eNodeB 708 by calling the implementation of the "Node Authentication" SON function 730 on the home eNodeB 708 using the Home eNodeB's SON-F IRP. In one embodiment there could be an agent on the home eNodeB, in an alternative embodiment the home eNodeB may use the SON-F IRP agent in the domain manager, or, in yet another embodiment, there could be a vendor specific implementation in said home eNodeB.
- 3d: The Configuration of home eNodeB function 722 tests the Home eNodeB 708 by calling the implementation of the "Self Test" SON Function 732 on the home eNodeB 708 using the Home eNodeB's SON-F IRP. Again, the SON-F IRP in the home eNodeB can be implemented in various ways as discussed in point 3c above.
- 3e: The Configuration of home eNodeB function 722 downloads the latest software to the home eNodeB 708 by calling the implementation of the "Automatic SW Download to eNodeB" SON Function 724 on its own domain manager 702 using the SON-F IRP on the SON bus 718.
- 3f: This step shows the SON function 722 triggering execution of another function 726 that is implemented in a network element 704 that is a peer of the domain manager 702. In this step the Configuration of Home eNodeB function 722 sets up transmission links for the Home eNodeB by calling the implementation of the "Transmission Setup" SON function 726 on the Transmission Network Domain Manager 704 using the SON-F IRP on the SON bus 718.
- 4: The Configuration of Home eNodeB function 722 gets the radio parameters for the home eNodeB 708 by calling the implementation of the "Planning Radio Parameters of new eNodeB" SON function 728 on the Radio Parameter Domain Manager 706 using the SON-F IRP over the Itf-P2P interface. It then downloads the parameters to the home eNodeB 708 and brings said home eNodeB 708 into service.

The SON-F IRP can be implemented in one embodiment on the SON Bus and in an alternative embodiment on the Itf-P2P interface. The SON Bus and the Itf-P2P are functionally equivalent, but their implementation is different.

The SON bus covers the case of a single distributed SON-F System implemented using an application server such as for example WebSphere, WebLogic, or jBoss. The SON bus runs over the Enterprise Service Bus in such a system. Therefore, the SON bus is distributed but is also internal to such a SON-F system and practically would be owned by a single organization. In such a setup there would probably be only one SON-F IRP agent working northbound.

The Itf-P2P case covers the inter-system case where two or more such SON-F Systems interact. In such a case, two or more SON-F IRP agents co-ordinates their activities so there is exchange of SON-F IRP messages on this interface. In other words, the SON-F IRP agents in each system use "getSupportedSONFunctions( )" to find out what the other can do, and then can call SON Functions on each other's systems.

Domain manager 702 in FIG. 7 is one embodiment of the network element in accordance with the present invention. The domain manager 702 operating in a communications network 700 comprises a SON-F IRP agent 710 that supports an interface (SON-F IRP) 450 for communicating with other network elements, including NMS and EMS. The domain manager 722 also has a first function 722 related to management of at least one network element and in the embodiment illustrated in FIG. 7 it is "Configuration of Home eNodeB" function. Said first function is one of a predefined set of functions (e.g. listed in Table 1). When said SON-F IRP agent 710 receives a request to execute said "Configuration of Home eNodeB" function 722 it sends to said function 722 a message that corresponds to said request received over the SON-F IRP. In order to maintain interoperability between devices of different vendors the request received is also from a set of predefined requests. The message sent by the agent 710, when received by said function 722 triggers execution of the "Configuration of Home eNodeB" function 722 in said network element 702.

One embodiment of a network 700 in accordance with the present invention is illustrated in FIG. 7. The communications network 700 comprises a plurality of network elements 702-708 wherein at least one of said network elements 702 comprises a SON-F IRP agent 710 supporting an interface 450 for communicating with other network elements. Said network element also comprises an implementation of a first function 722 that relates to management of at least one network element. When the SON-F IRP agent receives over said interface a request to execute "Configuration of Home eNodeB" function 722 (i.e. said first function) it sends to the "Configuration of Home eNodeB" function a message corresponding to said request. When the message is received by said function it triggers execution of "Configuration of Home eNodeB" function in said network element. What is important in embodiments of the present invention is that the function related to management of network element is implemented very close to said network element that is affected by its execution. The function is executed in the network element where it is implemented, but it may also invoke other functions related to management of network elements implemented in the same network element, like for example "Automatic SW Download" to eNodeB function 724 implemented in said network element 702 (domain controller). It may also invoke function implemented in another network element, like for example "Node Authentication" function 730 in Home eNodeB 708.

As mentioned earlier in order maintain interoperability between devices of different vendors the request received is from a set of predefined requests and also the functions related to management of network elements are from a predefined set of functions.

Further details of operations of the network element 702 and the network 700 were described in detail in the paragraphs related to various embodiments of the method of the present invention.

The invention claimed is:

1. A method for use in management of network elements in a 3GPP wireless communications network operating as a Self Organizing Network (SON) performed by a network element of said network, the method comprising:
   receiving, via an interface, by an agent operating in said network element, said interface being a 3GPP Integration Reference Point implemented as an application programming interface (API) for invoking SON functions, a request, said request being from a predefined set of requests, to execute a first SON function, said first SON function being from a predefined set of SON functions, wherein said first SON function relates to management of at least one network element and said first SON function is implemented in a network element where it is to be executed;
   sending to said first SON function a message corresponding to said request; and
   executing said first SON function.

2. The method according to claim 1, wherein the first SON function is implemented in said network element.

3. The method according to claim 1, further comprising triggering by the first SON function execution of at least one another SON function implemented in said network element or in a second network element, wherein said second network element is controlled by the network element.

4. The method according to claim 1, comprising recording SON functions and changes of the SON functions implemented in said network element in a register in said network element.

5. The method according to claim 4, comprising recording in said register SON functions and changes of the SON functions implemented in at least one network element controlled by said network element and/or in at least one network element that is peer of said network element.

6. A network element for a 3GPP wireless communications network operating as a Self Organizing Network (SON), comprising:
   an agent servicing an interface for communicating with other network elements, wherein said interface is a 3GPP Integration Reference Point implemented as an application programming interface (API) for invoking SON functions; and
   a first SON function related to management of at least one network element, said first SON function being from a predefined set of SON functions;
   wherein said agent is adapted to receive via said interface a request, said request being from a predefined set of requests, to execute said first SON function and to send to said first SON function a message corresponding to said request, wherein said message triggers execution of said first SON function in said network element.

7. The network element according to claim 6 comprising a register adapted to record information about SON functions and changes of the functions implemented in said network element.

8. The network element according to claim 6, further comprising a software bus for transmitting messages between said agent and said first SON function.

9. The network element according to claim 6, wherein said first SON function is adapted to trigger execution of at least one another SON function implemented in said network element or in a second network element, wherein said network element is adapted to control said second network element.

10. The network element according to claim 8, wherein the software bus is implemented as an Enterprise Service Bus.

11. The network element according to claim 6, wherein said first SON function is further adapted to trigger execution of at least one another SON function implemented in a third network element wherein said third network element is a peer of said network element.

12. The network element according to claim 6, comprising a Network Resource Model and adapted to change at least one Managed Object in said Network Resource Model as a result of executing said first SON function and to tag said at least one Managed Object with a tag identifying said first SON function and a transaction that changed said Managed Object.

13. A 3GPP wireless communications network operating as a Self Organized Network (SON), comprising a plurality of network elements wherein at least one of said network elements comprises:
   an agent servicing an interface for communicating with other network elements, wherein said interface is a 3GPP Integration Reference Point implemented as an application programming interface (API) for invoking SON functions; and
   a first SON function related to management of at least one network element, said first SON function being from a predefined set of SON functions;
   wherein said agent is adapted to receive via said interface a request, said request being from a predefined set of requests, to execute said first SON function and to send to said first SON function a message corresponding to said request, wherein said message triggers execution of said first SON function in said network element.

14. The network according to claim 13, wherein said network element comprises a register adapted to record information about SON functions and changes of the SON functions implemented in said network element.

15. The network according to claim 13, wherein said network element comprises a software bus for transmitting messages between said agent and said first SON function.

16. The network according to claim 13, wherein said first SON function is adapted to trigger execution of at least one another SON function implemented in said network element or in a second network element, wherein said network element is adapted to control said second network element.

17. The network according to claim 13, wherein said first SON function is further adapted to trigger execution of at least one another SON function implemented in a third network element wherein said third network element is a peer of said network element.

* * * * *